United States Patent [19]
Anderson

[11] 3,902,067
[45] Aug. 26, 1975

[54] RADIOMETRIC APPARATUS
[75] Inventor: Alan S. Anderson, Littleton, Mass.
[73] Assignee: Williamson Corporation, Concord, Mass.
[22] Filed: Feb. 22, 1974
[21] Appl. No.: 444,783

[52] U.S. Cl. ................. 250/342; 250/205; 250/338
[51] Int. Cl.² .......................................... G01J 1/00
[58] Field of Search ........... 250/338, 342, 354, 355, 250/346, 205, 210

[56]         References Cited
           UNITED STATES PATENTS
| | | | |
|---|---|---|---|
| 1,970,103 | 8/1934 | Runalduc | 250/210 |
| 3,354,773 | 11/1967 | Shreve | 250/205 |
| 3,675,019 | 7/1972 | Hill | 250/355 |

*Primary Examiner*—Harold A. Dixon
*Attorney, Agent, or Firm*—Kenway & Jenney

[57]         ABSTRACT

In the radiometric apparatus disclosed herein, energy from a reference source is chopped out-of-phase with energy from the target, the reference source being energized by a servo loop in a null balance mode. In order to permit the servo loop, including the reference source, to operate properly even though the target temperature approaches the ambient temperature at the radiometric apparatus, the apparatus employs another radiation source which is energized at a predetermined constant level. This latter source is located in the same portion of the field of view of the detector as the target so that radiation from this second source is chopped synchronously with any radiation from the target. Accordingly, the energization of the reference source is indicative of the sum of the radiation from the target and the source which is in the same field of view with the target.

9 Claims, 2 Drawing Figures

RADIOMETRIC APPARATUS

BACKGROUND OF THE INVENTION

This invention relates to radiometric apparatus and more particularly to such apparatus which will measure the temperature of targets even though that temperature approaches the ambient temperature at the radiometric apparatus.

Various types of radiometric apparatus are known in the art for the non-contact measurement of temperatures. The object whose temperature is being measured is generally referred to as the target. One of the most accurate types of radiometric apparatus is that which operates in a null balance mode. In this mode of operation, the target temperature is compared with the effective temperature of a reference source, typically an incandescent lamp. These two radiation components are chopped out-of-phase before being applied to a detector. The output signal from the detector controls a servo loop which energizes the reference source so as to minimize the difference between the two energy levels. The level of energization of the reference source is then indicative of the target temperature. This type of system attains a relatively high degree of accuracy since the characteristics of the reference source are typically much more predictable and more accurately known than those of the commonly used detector elements. Further, the characteristics of the reference source are typically much less affected by changes in ambient conditions than the characteristics of the detectors commonly used with the infrared wavelengths of interest.

Heretofore, however, it has been difficult to utilize such null balance radiometers when the temperature of the target approaches ambient temperature, i.e., the temperature in the environment of the radiometric apparatus itself. At such low temperatures, the radiation received from the target is at a very low level and, correspondingly, the reference source must be operated at an extremely low level of energization so that it does not produce much additional energy to the detector over that background level which exists as a result of the ambient temperature in the environment of the apparatus. At such low levels of energization, the incandescent lamp normally used becomes extremely slow in response and also somewhat less predictable. Further, the rest of the servo system has to be operated at extremely high levels of gain, necessitating further complexity of the electronic circuitry.

Among the several objects of the present invention may be noted the provision of radiometric apparatus which will determine the temperature of target objects with high accuracy; the provision of such apparatus which will operate when the target temperature approaches the ambient temperature in the environment of the radiometric apparatus; the provision of such apparatus which is highly reliable and which is of relatively simple and inexpensive construction. Other objects and features will be in part apparent and in part pointed out hereinafter.

SUMMARY OF THE INVENTION

Briefly, radiometric apparatus according to the present invention employs a detector element providing a signal which varies as a function of incident radiant energy. An optical system couples radiation from a target to the detector element and means are provided for chopping this radiation. In the same portion of the field of view of the detector as the target but occupying only a small portion of the target field of view, a controllable radiation source, energized at a predetermined level, provides to the detector a component of energy above the ambient radiation level in the apparatus, this component being chopped in synchronism with any energy received from the target. A second controllable radiation source, considered to be a reference source, provides further radiation energy incident on the detector, the chopping means being adapted to chop radiation from the reference source out-of-phase with the chopping of radiation from the target. A servo loop controls the energization of the reference source as a function of the signal provided by the detector element, the direction of control being to minimize the a.c. component of that signal at the chopping frequency. Accordingly, the energization of the reference source is indicative of the sum of the radiation from the target and the first source, said first source providing a radiometric offset.

BRIEF DESCRIPTION OF THE DRAWINGS

Corresponding reference characters indicate corresponding parts throughout the several views of the drawings.

DESCRIPTION OF THE PREFERRED EMBODIMENT

Figure 1:
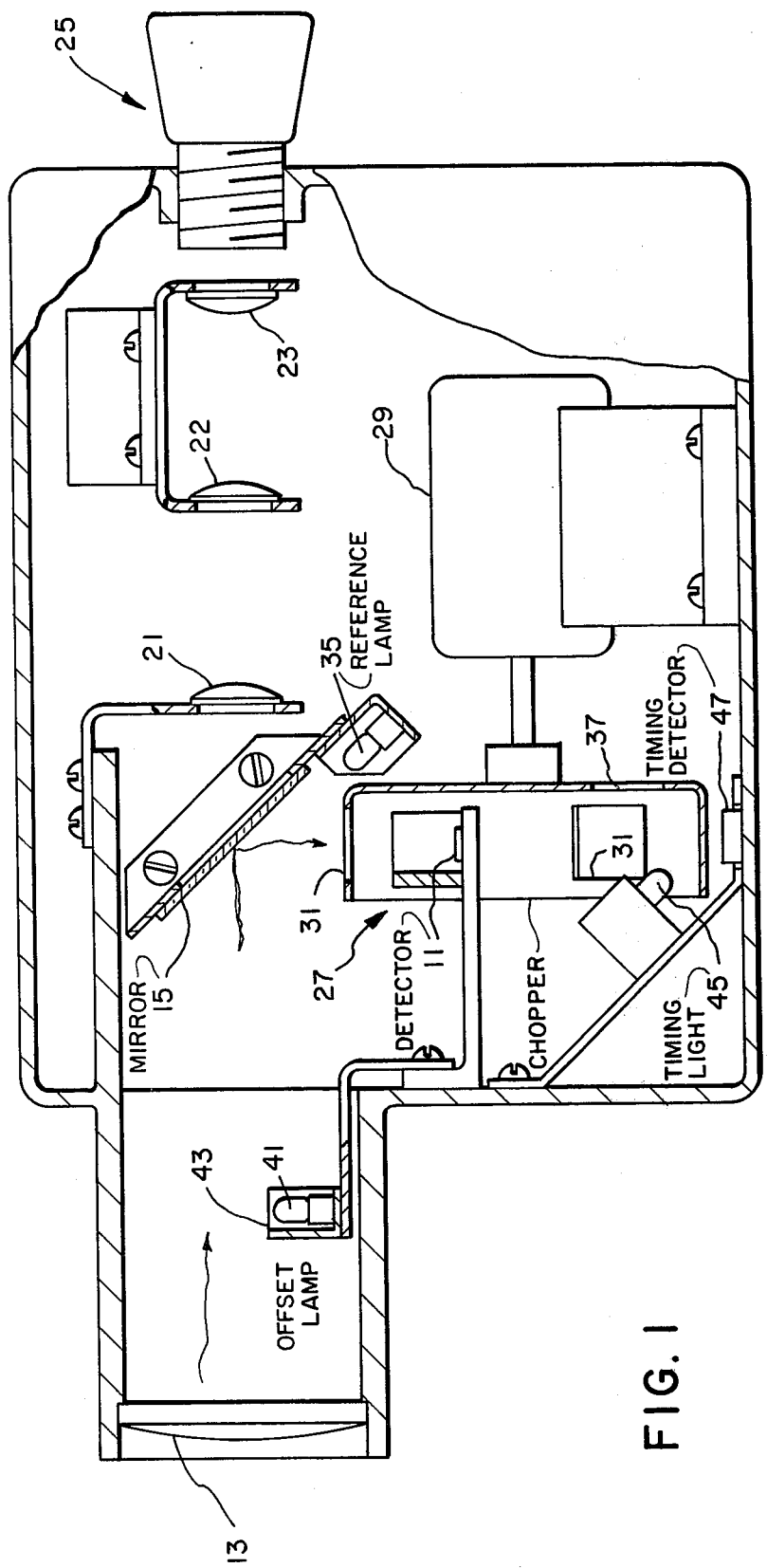
FIG. 1 is a side view, with parts broken away, showing the arrangement of optical components in radiometric apparatus constructed in accordance with the present invention.

Referring now to FIG. 1, there is indicated at 11 a detector suitable for detecting radiation at the infrared wavelengths typically employed for non-contact temperature measurement, e.g. a lead sulfide detector. As is understood, such a detector element can provide an electrical signal which varies as a function of incident radiation. Radiation from a target object is collected by a suitable objective lens 13 and directed down onto the detector 11 by a dichroic mirror 15. The characteristics of the dichroic mirror 15 are chosen so that infrared radiation is reflected down onto the detector while substantial visible radiation passes through the mirror. To facilitate aiming of the radiometric apparatus, this visible radiation is coupled, by means of inverting and relay lenses 21–23 to an eyepiece 25.

Radiation from the target can be chopped, between the mirror 15 and the detector 11, by means of a drum-like chopping member 27 which is rotated by means of a motor 29. The rim portion of chopping member 27 includes a plurality of apertures 31, as indicated, so that radiation from the target is alternately blocked and allowed to pass to the detector as the chopping member rotates.

A reference lamp 35 is mounted to one side of the drum-like chopping member 27 as indicated and the base portion of the drumlike member 27 is periodically apertured, as indicated at 37, so that radiation from the reference lamp 35 is alternately blocked and allowed to fall upon the detector 11. The angular positions of the apertures 37 are staggered with respect to the positions of the apertures 31 so that the radiation from the reference lamp 35 is chopped 180° out-of-phase with any radiation received from the target.

In accordance with the present invention, another lamp, designated 41, is mounted so as to be in the same portion of the field of view of detector 11 as any radiation received from the target object. In the embodiment illustrated, lamp 41 is located within the barrel of objective lens 13. Accordingly, infrared energy from the lamp 41 can also be reflected by the dichroic mirror 15 down onto the photocell, this additional component of radiation being chopped in synchronism with any radiation received from the target object. Lamp 41, which is referred to hereinafter as a radiometric offset lamp, is preferably partially surrounded by a shield 43 so that its radiation is directed largely back toward the mirror 15. While, in the embodiment illustrated, incandescent lamps have been employed as the reference and radiometric offset sources, it should be understood that other sources could also be used such as light emitting diodes or black body sources of various types.

At a point spaced from the infrared detector 11 with respect to the periphery of the drum-shaped chopping member 27, there is mounted a so-called interrupter module comprising a lamp 45 and a photodetector diode 47. This pair of elements operates in conventional manner to provide a timing or phase reference signal used in demodulating the infrared detector signal, as described hereinafter.

Figure 2:
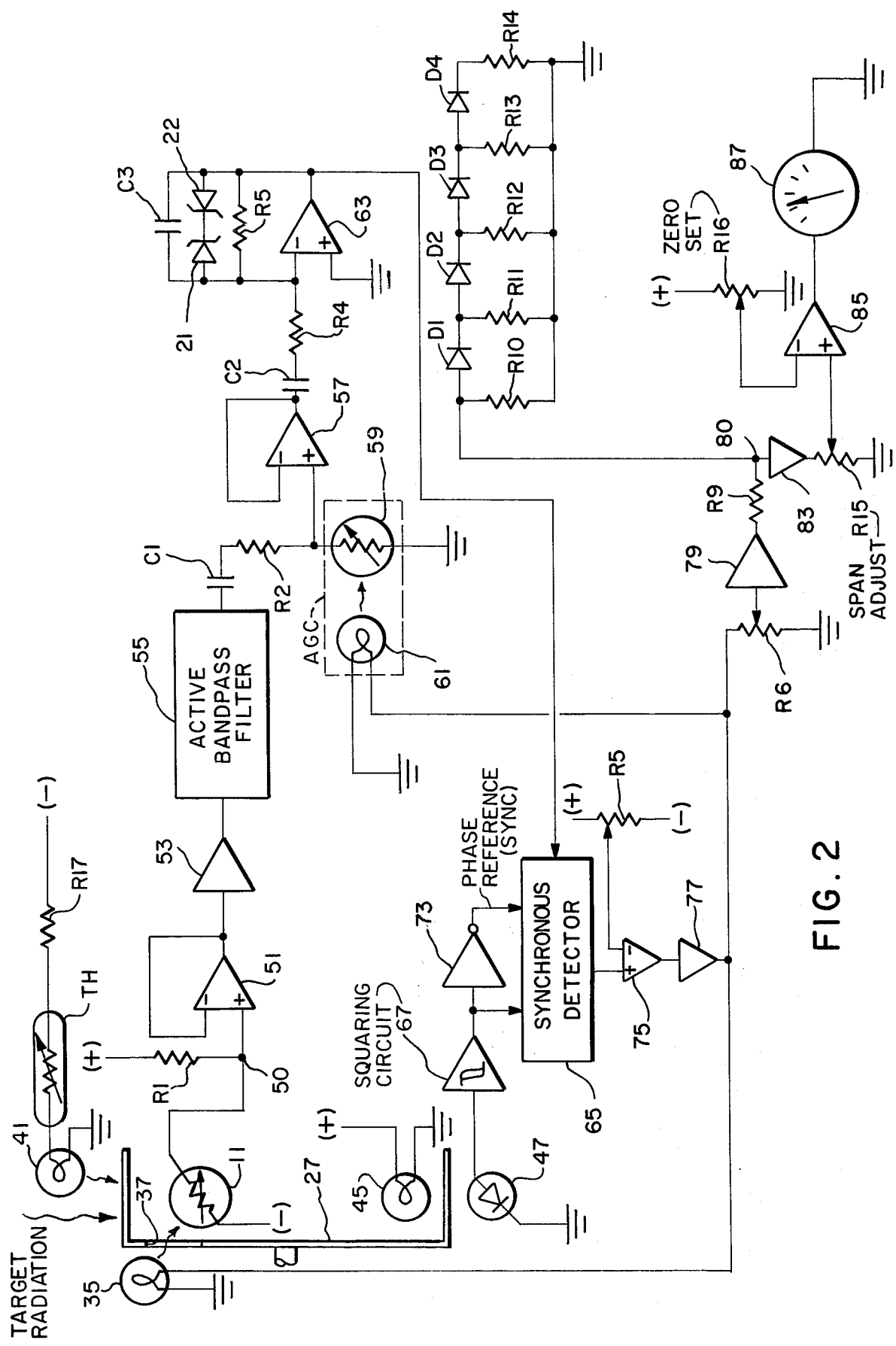
FIG. 2 is a schematic block diagram illustrating apparatus of this invention, including the arrangement of electronic components employed in conjunction with the components shown in FIG. 1.

Referring now to FIG. 2, it can be seen that the detector 11 is connected in a voltage divider circuit with a resistance R1 across positive and negative supply voltages so as to provide, at junction 50, a voltage signal which varies as a function of the radiation incident on detector 11. As described previously, the detector element 11 receives radiation both from the target and from the offset lamp 41 during one phase of the optical chopping cycle and, during the alternate phase of the chopping cycle, receives radiation from the variably energized reference lamp 35.

Unless the effective radiation levels during the two phases are equal, taking into consideration the spectral sensitivity characteristics of detector 11, the signal provided at junction 50 will have a substantial a.c. component at the chopping frequency. As indicated previously, the radiometric apparatus of the present invention operates in a null balance mode in which the energization of the reference lamp 35 is varied by a servo loop responsive to the detector signal, the direction of the servo loop control being to minimize the a.c. component. The offset lamp 41, in contrast, is operated at an essentially constant, predetermined level of energization as described hereinafter.

The detector signal is applied, through a voltage following, impedance-shifting amplifier 51 and a fixed-gain amplifier 53, to an active bandpass filter 55. Filter 55 serves to minimize extraneous signals which are substantially above or below the chopping frequency. Signals in a passband centered on the chopping frequency are a.c. coupled, through a capacitor C1, to a voltage divider circuit which feeds another voltage follower amplifier 57. The voltage divider circuit comprises a fixed resistor R2 in series with a cadmium sulfide photocell 59. Photocell 59 is employed as a controllably variable resistance and for this purpose is illuminated by a lamp 61. The attenuation provided by the voltage divider is thus controllable as a function of the energization of the lamp. As explained hereinafter, this controllable attenuation functions to provide an a.g.c. (automatic gain control) function.

The buffered signal from amplifier 57 is a.c. coupled, through a capacitor C2, to an amplifier 63 whose gain is controlled by a feedback network comprising resistors R4 and R5. The feedback resistor R5 is shunted by a pair of back-to-back Zener diodes Z1 and Z2 which cause the amplifier to clip when the output level exceeds a predetermined value. The Zener diodes themselves are shunted by a capacitor C3 which damps clipping transients.

As will be understood by those skilled in the art, the signal obtained from amplifier 63 will still be essentially related to the signal obtained from the detector element 11, though subjected to variable gain and limiting as described above. This signal is applied to a synchronous detector 65. The signal obtained from the photodiode 47 is applied to a squaring circuit 67 and an inverter 73 to provide out-of-phase or complementary phase reference signals to the detector circuit 65 to enable the synchronous detection of the information-bearing signal obtained from amplifier 63. The synchronous detector circuit 65 operates, in conventional manner, to provide a d.c. signal responsive to the relative amplitudes of the alternate phases of the input signal.

The output signal from the synchronous detector is applied to the non-inverting input of a differential amplifier 75 while the inverting input is provided with an adjustable d.c. level by means of a potentiometer R5 so that the d.c. reference level of the amplifier output signal can be readily preselected. This output signal is then applied, through a unity voltage gain current amplifier 77, to the reference lamp 35 and to the a.g.c. control lamp 61.

As will be apparent to those skilled in the art, the energization of the lamp 35, responsive to the relative amplitudes of the alternate phases of the infrared detector signal, completes a servo loop. The operation of this servo loop is to adjust the energization of the lamp 35 in a sense tending to minimize the a.c. component of the infrared detector signal, i.e., to adjust the incident radiation provided by the lamp 35 to a level equal to the combined incident radiation provided by the target and the offset lamp 41. An indication of this level of radiation is provided by measuring the voltage applied to the lamp 35. The voltage applied to the lamp 35 is coupled, through a potentiometer R6 to a voltage follower amplifier 79. Amplifier 79 drives a linearizing circuit comprising a series resistor R9 which is coupled, by a series string of silicon diodes D1–D4, to a succession of shunt resistances R10–R14 of graded values. The essentially fixed forward voltage drop across each diode allows the successive shunt resistances to, in effect, be picked up successively. Thus, by appropriately grading the shunt resistances, a piecewise curve fitting or linearization may be produced. As is understood, the effective filament temperature of the lamp 35 is not a linear function of applied voltage but, by means of this curve fitting circuit, a close approximation of voltage with temperature can be provided, i.e., at the junction designated 80.

The linearized signal is applied, through a d.c. amplifier 83, to a potentiometer R15 which permits a sensitivity or so-called "span" adjustment of the ultimate output indication. The voltage from the potentiometer R15 is applied to a differential amplifier 85 which drives a meter 87. A d.c. reference voltage is applied, by means of a potentiometer R16, to the inverting input of amplifier 85 so that an effective zero adjustment of the output indication may be provided. The sensitivity and zero reference point of meter 87 can be adjusted independently, i.e., by means of the potentiometers R15 and R16, and it can thus be seen that the meter 87 can be calibrated to display any range or portion of a range of temperatures within the overall capabilities of the instrument. Further, the adjustable zero set allows the effect of the offset lamp to be cancelled out in the ultimate reading so that the meter 87 is responsive to target temperature rather than to the total radiation received by the detector 11 during that chopping phase when the target radiation is incident. Similar and parallel output circuits may be provided to drive other indicating or recording devices, e.g., a strip chart recorder.

As indicated previously, the offset lamp 41 is energized at a preselected, essentially constant level to provide an offset or pedestal level for the radiation from the target. In the preferred embodiment illustrated, the lamp 41 was a standard type No. 334 incandescent lamp energized from 15 volt negative d.c. supply through a 1500 ohm fixed resistor and a 1000 ohm thermistor having a negative temperature coefficient. In this embodiment, the thermistor was a Fenwal Model KA 31 L1 having a resistance of 1000 ohms at 77°F and a resistance of 580 ohms at 100°F. The thermistor was included in the circuit to provide a slight compensation for second order effects due to changes in ambient temperatures affecting the radiometric apparatus itself. The energization of the offset lamp 41, however, is essentially constant, i.e., it is not dynamically varied during the operation of the apparatus in any manner comparable to the reference lamp 35, and no variation at all is contemplated at any given ambient temperature.

As indicated previously, the radiation from the offset lamp 41 provides a pedestal or stepwise increase in the level of radiation received by the infrared detector element 11 during the chopping phase when the target radiation is incident. Since this is the radiation level which the reference lamp 35 is attempting to match under the servo loop control, it can be seen that the energization of the lamp 35 will be higher than if the offset lamp 41 were not present. The effect of this offset is to allow the reference lamp 35 to operate at a readily controllable level of energization, even though the radiation coming in from the target itself is at an extremely low level, i.e., a level which could not be effectively matched by the lamp 35 itself since the lamp would be effectively extinguished at that temperature. As is understood by those skilled in the art and as indicated previously, servo loop operation becomes extremely difficult at very low levels of energization and the response of the lamp 35 to changes in the servo loop output signal becomes very slow. With the use of the offset lamp, however, it is possible to measure target temperatures approaching the ambient temperature at the radiometric apparatus itself, even to the point where it may be considered that the net flow of infrared radiation is from the detector element to the target, rather than the other way around.

While the use of the offset lamp in turn produces an offset in the output signal, this offset remains relatively stable since, as discussed previously, the characteristics of incandescent lamps are quite stable and predictable, particularly when operated at reasonable levels of energization. Further, this offset can be readily accounted for and a compensating offset can be introduced electrically in the output signals, e.g., by means of the potentiometer R16. Thus, the use of an offset lamp in accordance with the present invention allows the advantages of null balance radiometry to be extended to permit non-contact, radiometer temperature measurement at very low temperatures, e.g., temperatures approaching, at, or even below ambient at the radiometric apparatus itself. For example, instruments have been constructed providing usefully accurate temperature measurements down to 70°F. As used herein, reference to temperatures approaching ambient should be understood to include temperatures equal to or otherwise indistinguishable from ambient.

In view of the foregoing, it may be seen that several objects of the present invention are achieved and other advantageous results have been attained.

As various changes could be made in the above constructions without departing from the scope of the invention, it should be understood that all matter contained in the above description or shown in the accompanying drawings shall be interpreted as illustrative and not in a limiting sense.

What is claimed is:

1. Radiometric apparatus responsive to target temperatures approaching ambient, said apparatus comprising:
    a detector element providing a signal which varies as a function of incident radiant energy;
    an optical system for coupling radiation between a target and said detector element;
    means for chopping radiation energy between said target and said detector element;
    in the same portion of the field of view of said detector element as said target, a controllable radiation source energized at a predetermined level to provide to said detector a component of energy above the ambient radiation level in said apparatus, said component being chopped in synchronism with any energy received from said target;
    a second controllable radiation source for providing radiation energy incident on said detector, said chopping means including means for chopping radiation from said second source out-of-phase with the chopping of radiation from said target; and
    servo loop means for controlling the energization of said second source as a function of the signal provided by said detector element to minimize the a.c. component of said signal at the chopping frequency, the energization of said second source being indicative of the sum of the radiation from said target and the first said source.

2. Apparatus as set forth in claim 1 wherein said controllable radiation sources are incandescent lamps.

3. Apparatus as set forth in claim 1 wherein said servo loop means includes a synchronous detector for demodulating the a.c. component of the signal provided by the detector element.

4. Apparatus as set forth in claim 3 further comprising optical sensing means coupled to said chopping means for providing a phase reference signal to said synchronous detector.

5. Apparatus as set forth in claim 1 wherein said detector is a lead sulfide cell.

6. Radiometric apparatus comprising:
a detector element providing a signal which varies as a function of incident radiant energy;
an optical system for coupling radiation between a target and said detector element;
means for chopping radiation energy between said target and said detector element;
between said optical system and said chopping means and in the same portion of the field of view of said detector element as said target, a controllable radiation source energized at a predetermined level which is unchanging during operation of said apparatus to provide to said detector a fixed component of energy above the ambient radiation level in said apparatus, said component being chopped in synchronism and in phase with any energy received from said target;
means for measuring the level of radiation reaching said detector element during the periods when said detector element can receive radiation from the target; offset means for providing a signal having a level corresponding to the value of said fixed component; and
means for registering a radiation level value corresponding to the difference between the level actually measured and a value.

7. Apparatus as set forth in claim 6 wherein said measuring means includes a detector circuit for demodulating the a.c. component at the chopping frequency of the signal provided by said detector element.

8. Apparatus as set forth in claim 7 wherein said detector circuit is a synchronous detector and wherein said apparatus includes optical sensing means coupled to said chopping means for providing a phase reference signal to said synchronous detector.

9. Radiometric apparatus responsive to target temperatures approaching ambient, said apparatus comprising:
a detector element providing a signal which varies as a function of incident radiant energy;
an optical system for coupling radiation between a target and said detector element;
means for chopping radiation energy between said target and said detector element;
in the same portion of the field of view of said detector element as said target, an offset lamp energized at a predetermined, essentially constant level to provide to said detector a component of energy above the ambient radiation level in said apparatus, said component being chopped in synchronism with any energy received from said target;
a reference lamp for providing radiation energy incident on said detector, said chopping means including means for chopping radiation from said reference lamp out-of-phase with the chopping of radiation from said target;
means responsive to the operation of said chopping means for providing a phase reference signal;
synchronous detector means controlled by said reference signal to demodulate the a.c. component of the signal provided by said detector element to obtain a feedback signal which varies as a function of the relative levels of radiation incident on said detector element during the alternate phases of optical chopping; and means for controlling the energization of said reference lamp as a function of the feedback signal thereby to balance the incident radiation levels during the alternate phases of chopping, the energization of said second source being indicative of the sum of the radiation from said target and said offset lamp.

* * * * *

UNITED STATES PATENT AND TRADEMARK OFFICE
CERTIFICATE OF CORRECTION

PATENT NO. : 3,902,067
DATED : August 26, 1975
INVENTOR(S) : Alan S. Anderson

It is certified that error appears in the above–identified patent and that said Letters Patent are hereby corrected as shown below:

Claim 6, Column 7, line 24, after "means" but before "for", insert --responsive to said measuring means and said offset means--; and on line 26, "a value" should be --said fixed component--.

Signed and Sealed this second Day of March 1976

[SEAL]

Attest:

RUTH C. MASON
Attesting Officer

C. MARSHALL DANN
Commissioner of Patents and Trademarks